United States Patent [19]

Sommer

[11] Patent Number: 5,195,623
[45] Date of Patent: Mar. 23, 1993

[54] TWO SPEED DRIVE WITH OIL SHEAR ELECTRO CLUTCH/BRAKE

[75] Inventor: Gordon M. Sommer, Grosse Pointe Farms, Mich.

[73] Assignee: Sommer Company, Warren, Mich.

[21] Appl. No.: 825,034

[22] Filed: Jan. 24, 1992

[51] Int. Cl.5 .................. F16D 67/06; F16H 37/06
[52] U.S. Cl. .................. 192/18 B; 74/661; 192/48.2; 192/113 A
[58] Field of Search ........... 192/84 AA, 18 B, 18 A, 192/48.2, 113 A; 74/661

[56] References Cited

U.S. PATENT DOCUMENTS

| | | | |
|---|---|---|---|
| 2,653,256 | 9/1953 | Walley et al. | 192/18 B X |
| 2,798,583 | 7/1957 | Jeszka et al. | 192/18 B X |
| 3,089,574 | 5/1963 | Howard. | |
| 3,473,639 | 10/1969 | Becker et al. | 192/18 B X |
| 3,494,450 | 2/1970 | Mankowsky et al. | |
| 3,614,999 | 10/1971 | Sommer | 192/18 A |
| 3,696,898 | 10/1972 | Sommer | 192/18 A |
| 3,713,517 | 1/1973 | Sommer | 192/18 A |
| 3,835,971 | 9/1974 | Spanke et al. | 192/18 A |
| 3,946,840 | 3/1976 | Sommer | 192/18 A |
| 4,096,931 | 6/1978 | Whitehurst | 192/18 A |
| 4,135,611 | 1/1979 | Spanke | 192/18 A |
| 4,183,425 | 1/1980 | Sommer | 192/18 A X |
| 4,432,443 | 2/1984 | Sommer | 192/12 R |
| 4,456,109 | 6/1984 | Bottomley et al. | 192/18 A |
| 4,458,794 | 7/1984 | Yater | 192/18 A |
| 4,552,255 | 11/1985 | Sommer | 192/18 A |
| 4,577,738 | 3/1986 | Yater | 192/18 A |
| 4,598,804 | 7/1986 | Sommer | 192/0.02 R |
| 4,607,736 | 8/1986 | Kelley | 192/18 A |
| 4,693,350 | 9/1987 | Sommer | 192/18 A |
| 4,739,865 | 4/1988 | Yater et al. | 192/18 A |
| 4,785,926 | 11/1988 | Matson | 192/18 A |
| 4,921,078 | 5/1990 | Sommer | 188/171 |

Primary Examiner—Rodney H. Bonck
Attorney, Agent, or Firm—Harness, Dickey & Pierce

[57] ABSTRACT

A two speed drive for an apparatus which uses DC electrically actuated oil shear brake/clutch units is disclosed. The two speed drive directly connects the output to a first input for high speed movement using a DC voltage coil to actuate the clutch/brake for low speed operation. The output is connected to a second input through a gearing system using another DC voltage coil to actuate the clutch/brake. The DC voltage coils provide a repeatable and variable acceleration curve for exact operation of the drive.

7 Claims, 4 Drawing Sheets

TWO SPEED DRIVE WITH OIL SHEAR ELECTRO CLUTCH/BRAKE

BACKGROUND OF THE INVENTION

The present invention relates to drive systems. More particularly, the present invention relates to a two speed drive system using oil shear clutch/brake units for use on tool trays.

Various drive systems have been developed which are capable of moving loaded tool trays or similar objects a specified distance in a specified amount of time. With the introduction of automatic equipment and automated assembly lines, the accuracy with which these objects need to be positioned has become tighter and tighter.

A number of drive systems in use today rely on compressed air for actuation. Normally this compressed air is obtained from a central compressed air supply system which provides compressed air to all areas of the plant. The central system is prone to the problems of dirty air and inconsistent pressures due to the large volume of the system as well as the intermittent use by other areas throughout the plant. This lack of a clean and consistent supply of compressed air results in a drive system which is incapable of providing consistent acceleration and deceleration ramps which results in a loss of accuracy when moving the tool tray or similar object to its final position.

Accordingly what is needed is a dependable drive system for a tool tray or other objects which is capable of delivering the tool tray to a specified location in a specified amount of time and with a specified accuracy on a repeatable basis.

SUMMARY OF THE INVENTION

The present invention provides the art with a two speed drive system which is capable of delivering a tool tray or other object to a specified position on a repeatable basis within the accuracy required by the machine tool builders to accommodate automization of lines.

The present invention uses an integral design which puts all of the systems functions into one integral assembly. This results in a reduced number of parts in the system resulting in reduced downtime and an increase in the meantime between service. To eliminate the problems of dirty and inconsistent air, the present invention replaces air actuation with electric actuation. This provides a very consistent and repeatable operation with acceleration and deceleration ramps more consistent. By using electric actuation, the acceleration and deceleration ramps can easily be adjusted to accommodate various requirements.

The reliability of the main drive motor of the two speed drive system is substantially enhanced in the present invention by having the main motor started in a no-load condition and having the main motor disconnected from the system during deceleration and final stopping. The reversing of the motor which is necessary for reverse movement of the tool tray or object, is also done under no-load conditions between cycles.

DESCRIPTION OF THE DRAWINGS

Further objects, features and advantages of the present invention will become apparent from the analysis of the following written specification, the accompanying drawings and the appended claims in which:

DETAILED DESCRIPTION OF THE INVENTION

Figure 1:
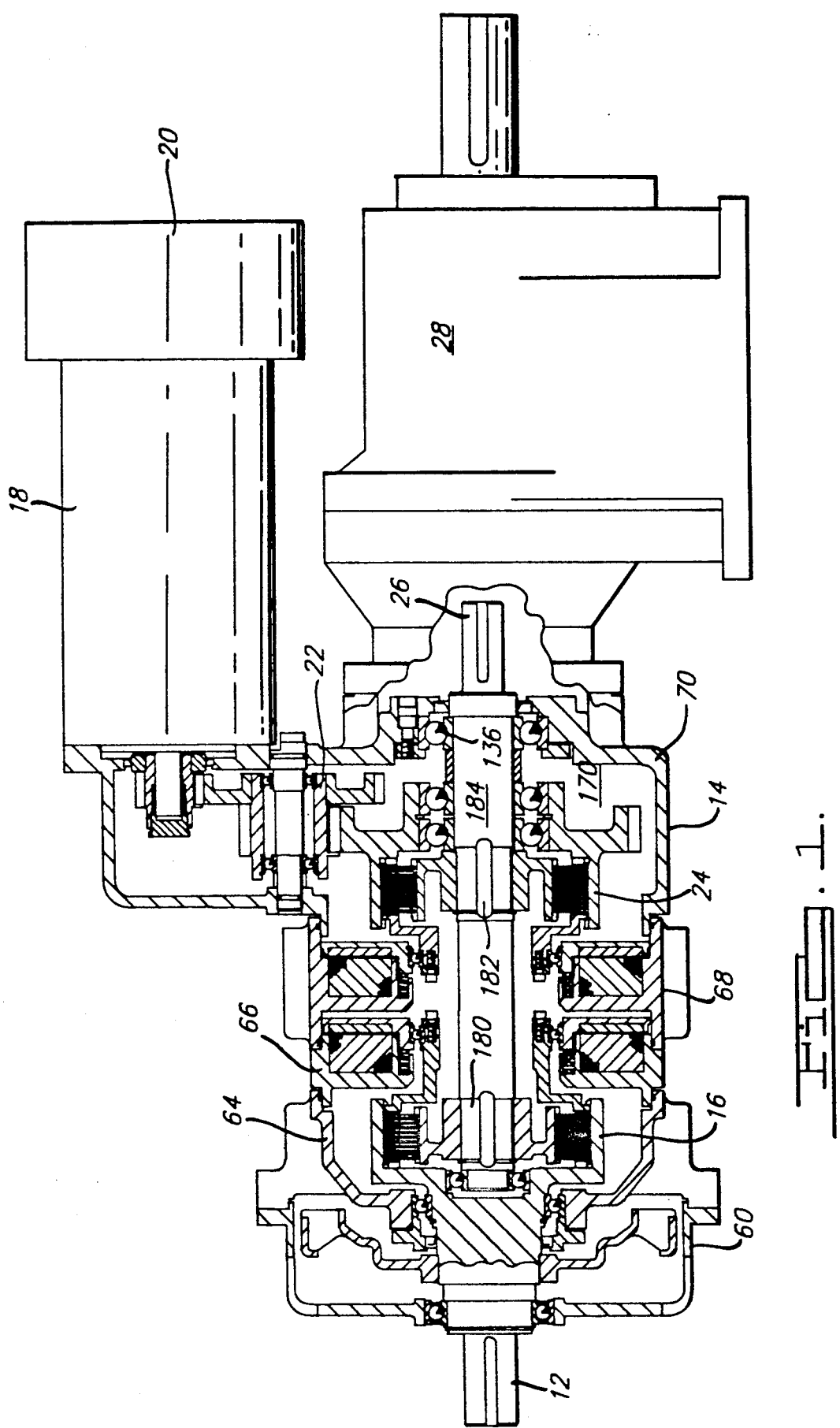
FIG. 1 is a side view partially in cross section of the two speed drive system in accordance with the present invention.
Figure 2:
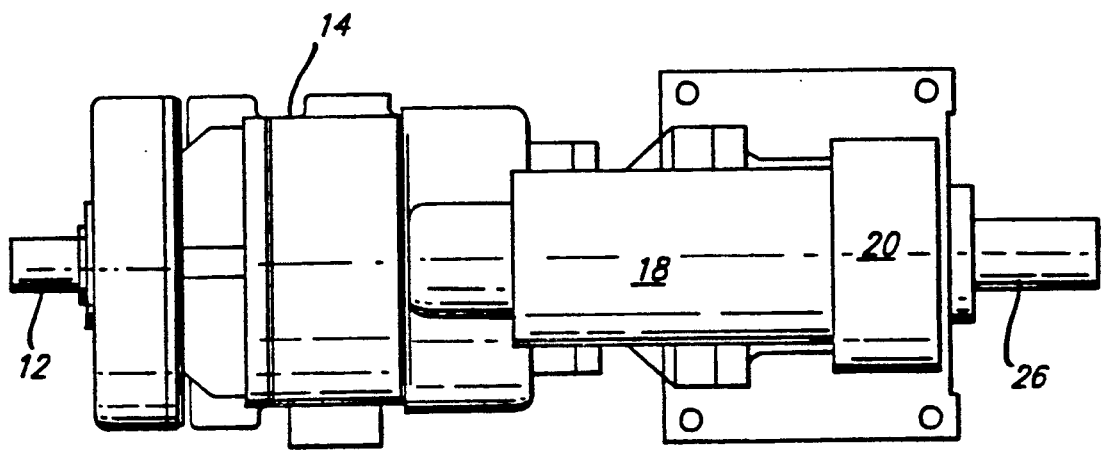
FIG. 2 is a top view of the two speed drive system in accordance with the present invention.

FIGS. 1, 2, 4 and 5 show a two speed drive designated by reference numeral 10 in accordance with the present invention. The two speed drive comprises input shaft 12, housing assembly 14, clutch 16, low speed drive motor 18, motor brake 20, a first gear reduction unit 22, drive brake 24, output shaft 26 and a second gear reduction unit 28.

Input shaft 12 is driven at one end 40 at a specified speed by a high speed drive motor (not shown). This motor can be connected to the input shaft 12 by a flexible coupling, drive belts or any other connection means known in the art. Input shaft 12 is rotatably located in housing 14 by a set of roller bearings 42 and is rotatable about axis 38. The end of the input shaft 12 opposite the drive end 40 has a first cylindrical shaped chamber 44 and a second cylindrical shaped chamber 46. First cylindrical shaped chamber 44 has a roller bearing 48 for supporting the output shaft 26 as will be explained later herein. Second cylindrical shaped chamber 46 has an interior surface which is adapted with a plurality of axially extending splines 49 which support a plurality of driving clutch plates 194 of the clutch 16 as will be explained later herein.

Housing assembly 14 comprises a fan housing 60, a bearing seal housing 62, a bearing housing 64, a clutch control housing 66, a drive brake control housing 68 and a gear reduction housing 70. Fan housing 60 supports one of the two roller bearings 42 at one end and is adapted to be fixedly attached to the bearing housing 64 at the opposite end. The fan housing 60 forms a cylindrical chamber 72. Disposed within the cylindrical chamber 72 is fan 74. Fan 74 is fixedly mounted to input shaft 12 and rotates with input shaft 12 within cylindrical chamber 72. Fan housing 60 has a first plurality of apertures 76 which allow for the passage of cooling air pumped by fan 74.

Figure 4:
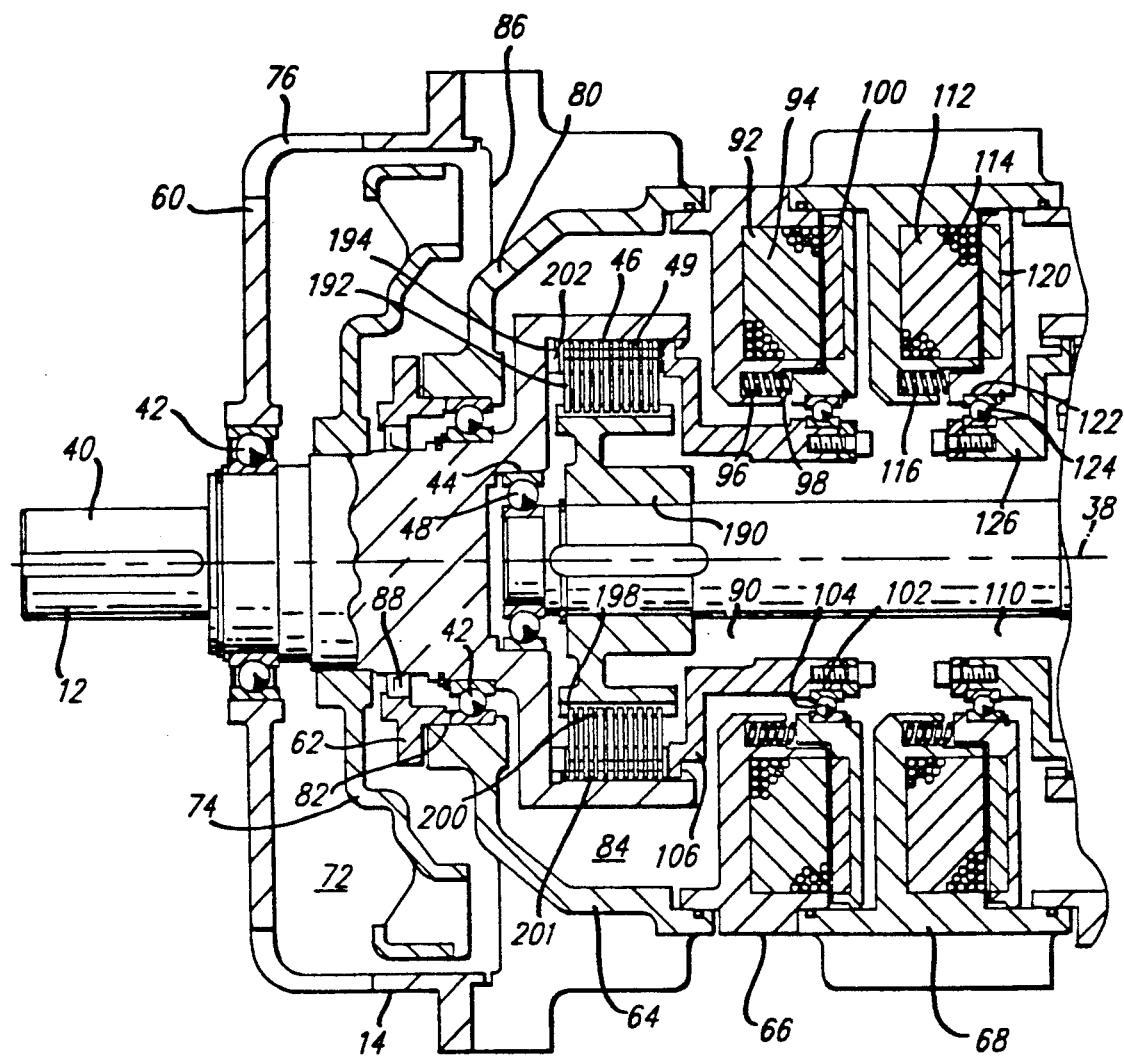
FIG. 4 is a side view partially in cross section of an enlarged view of the clutch and drive brake areas of the present invention.
Figure 5:
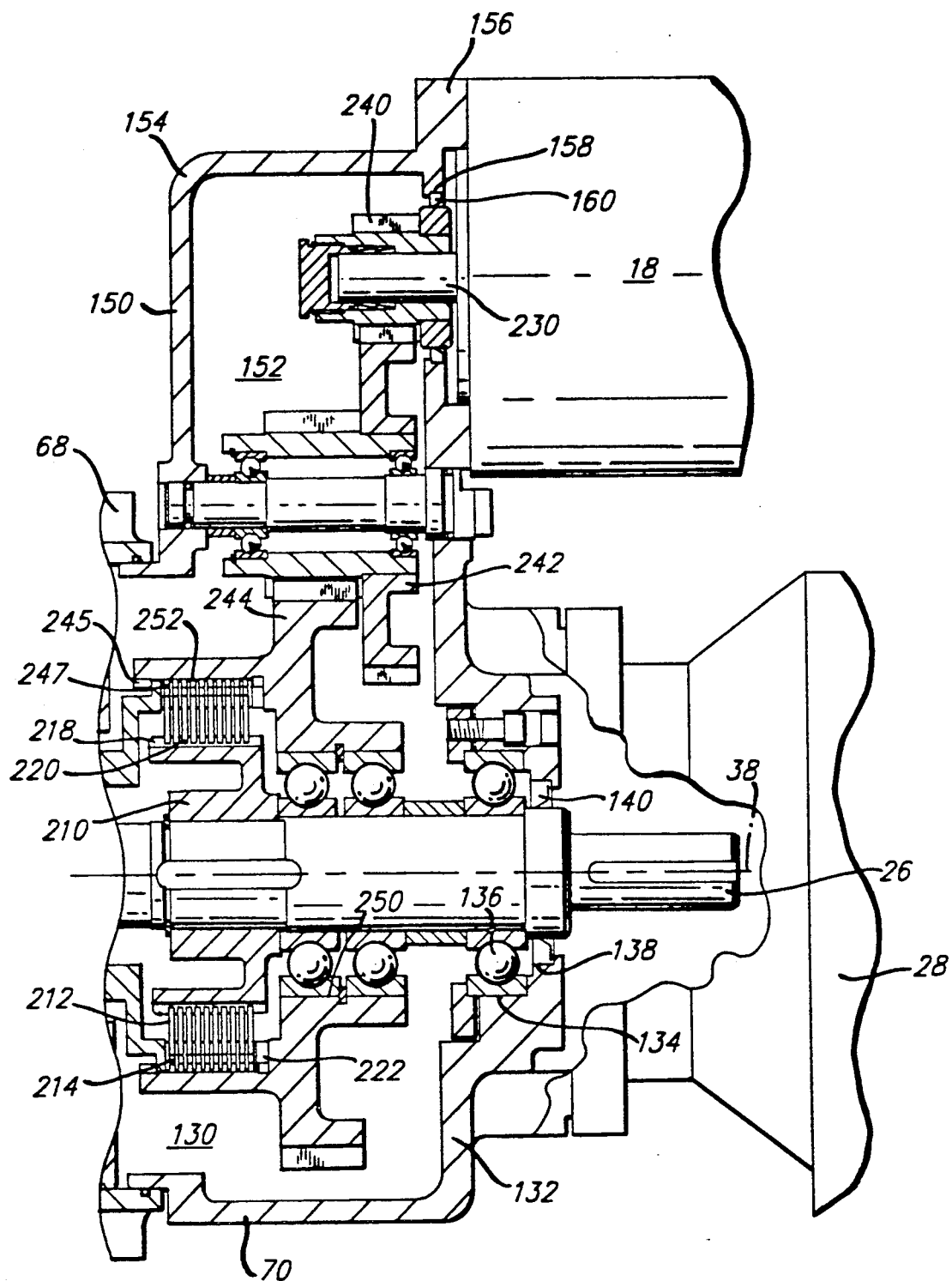
FIG. 5 is a side view partially in cross section of an enlarged view of the first gear reduction area of the present invention.

Bearing housing 64 is adapted at one end to be fixedly attached to the fan housing 60 and is adapted at the opposite end to be fixedly and sealably attached to the clutch control housing 66. Bearing housing 64 has a radially inwardly extending flange 80 located adjacent the end of bearing housing 64 adapted to mate with fan housing 60 which forms inner cylindrical surface 82. Inner cylindrical surface 82 supports the second of the two roller bearings 42 and forms a locating surface for bearing seal housing 62 as will be discussed later herein. The end of the bearing housing 64 which is adapted to mate with the clutch control housing 66 forms a cylindrical chamber 84. Disposed within cylindrical chamber 84 is the second cylindrical chamber 46 located on the end of input shaft 12 as shown in FIG. 4.

Bearing housing 64 has a second plurality of apertures 86 which allow for the passage of cooling air pumped by fan 74. The second plurality of apertures 86 cooperate with the first plurality of apertures 76 to create a path for air pumped by fan 74 to flow across bearing housing 64 and aid in cooling of oil disposed within cylindrical chamber 84. The bearing seal housing 62 is adapted to be fixedly and sealably attached to bearing housing 64 and is located by inner cylindrical surface 82. Bearing seal housing 62 locates seal 88 relative to input shaft 12. Seal 88 rides against input shaft 12 and seals the oil disposed in cylindrical chamber 84 from entering cylindrical chamber 72.

Clutch control housing 66 is adapted at one end to be fixedly and sealably attached to bearing housing 64 and is adapted at the opposite end to be fixedly and sealably attached to drive brake control housing 68. Clutch control housing 66 is annular in shape and defines a cylindrical chamber 90 which is adjacent and open to cylindrical chamber 84. Disposed within the annular portion of clutch control housing 66 is coil cavity 92. Disposed within the coil cavity 92 is a DC voltage clutch coil 94. The DC voltage clutch coil 94 is provided with means to actuate the clutch 16 as will be explained later herein. Also disposed within the annular portion of the clutch control housing 66 are a plurality of spring bores 96. The plurality of spring bores 96 are circumferentially spaced and are located radially inward from cavity 92. Disposed within the plurality of spring bores 96 are a plurality of coil springs 98.

A first annular pressure plate 100 is axially aligned with the annular clutch control housing 66 and is in contract with the plurality of coil springs 98. First pressure plate 100 is positioned such that it is capable of moving axially along axis 38. First annular pressure plate 100 defines inner cylindrical surface 102. Inner cylindrical surface 102 locates a roller bearing 104 which rotatably mounts a first activation means 106 which is used to engage and release clutch 16 as will be described later herein. The plurality of coil springs 98 urge the first pressure plate 100 and the first activation means 106 axially to the right as shown in FIG. 1. In this position the clutch 16 is in the released position. Upon activation of the DC voltage clutch coil 94, the first pressure plate 100 and the first activation means 106 are magnetically attracted and move axially to the left as shown in FIG. 1. The magnetic attraction of the DC voltage clutch coil 94 overcomes the spring force of the plurality of coil springs 98. In this position, clutch 16 is engaged. When the power to the clutch coil 94 is terminated, coil springs 98 urge the first pressure plate 100 to the right as shown in FIG. 1, releasing clutch 16.

Drive brake control housing 68 is adapted at one end to be fixedly and sealably attached to the clutch control housing 66 and is adapted at the opposite end to be fixedly and sealably attached to the first gear reduction housing 70. Drive brake control housing 68 is annular in shape and defines a cylindrical chamber 110 which is adjacent and open to cylindrical chamber 90. Disposed within the annular portion of the drive brake control housing 68 is a coil cavity 112. Disposed within coil cavity 112 is a DC voltage drive brake coil 114. The DC voltage drive brake coil 114 is provided with means to activate the drive brake coil 114 as will be explained later herein. Also disposed within the annular portion of the drive brake control housing 68 are a plurality of spring bores 116. The plurality of spring bores 116 are also circumferentially spaced and are located radially inward from cavity 112. Disposed within the plurality of spring bores 116 are a plurality of coil springs 118.

A second annular pressure plate 120 is axially aligned with the annular brake control housing 68 and is in contact with the plurality of coil springs 118. Second pressure plate 120 is positioned such that it is capable of moving axially along axis 38. Second annular pressure plate 120 defines inner cylindrical surface 122 which locates a roller bearing 124. Roller bearing 124 rotatably mounts a second activation means 126 which is used to apply and release drive brake 24 as will be described later herein. The plurality of coil springs 118 urge second pressure plate 120 and the second activation means 126 axially to the right as shown in FIG. 1. In this position, the drive brake 24 is in the applied condition. Upon activation of the DC voltage brake coil 114, the second pressure plate 120 and the second activation means 126 are magnetically attracted and move axially to the left as shown in FIG. 1. The magnetic attraction of the DC voltage brake coil 114 overcomes the spring force of the plurality of coil springs 118. In this position, the drive brake 24 is released. When the power to the brake coil 114 is terminated, the coil springs 118 urge the second pressure plate 120 to the right as shown in FIG. 1, applying the drive brake 24.

Gear reduction housing 70 is adapted at one end to be fixedly and sealably attached to drive brake control housing 68 and adapted at the opposite end to be fixedly attached to the second gear reduction unit 28. In between the two ends of the gear reduction housing, a cylindrical chamber 130 is formed. The cylindrical chamber 130 is adjacent and open to the cylindrical chamber 110. The end of the brake control housing 68 which is adapted to be fixedly attached to the second gear reduction unit 28 has a radially inwardly extending flange 132 the end of which forms inner cylindrical surface 134. Inner cylindrical surface 134 supports roller bearing 136 which rotatably locates the output shaft 26 generally on axis 38 as will be explained later herein. The radially inwardly extending flange 132 also forms inner cylindrical surface 138. Inner cylindrical surface 138 locates seal 140 relative to output shaft 26. Seal 140 rides against output shaft 26 and seals the oil disposed in the cylindrical chamber 130 from leaking out of the chamber.

Gear reduction housing 70 also has a radially extending lobe 150. Lobe 150 defines a lobe chamber 152 which is adjacent and connected to cylindrical chamber 130. The lobe chamber 152 is formed by wall 154 and plate 156. Plate 156 is an integral part and an extension of the end of the gear reduction housing 70 adapted to be fixedly attached to the second gear reduction unit 28. Plate 156 is adapted to be fixedly attached to the low speed drive motor 18 and has a cylindrical hole 158 through which drive shaft 230 of drive motor 18 is disposed. A seal 160 is provided between the cylindrical hole 158 and the drive shaft 230 for sealing the lobe chamber 152 from the low speed drive motor 18.

The combination of lobe chamber 152, cylindrical chamber 130, cylindrical chamber 110, cylindrical chamber 90, and cylindrical chamber 84 define a sealed cavity 170 which is sealed from the outside by seal 88 on one end and by seals 140 and 160 on the other. Disposed within sealed cavity 170 is a lubricating and cooling oil for the gears, bearings, brake and clutch drives.

Output shaft 26 is rotatably mounted in roller bearing 136 located in gear reduction housing 70. Output shaft 26 is connected at one end to the input of the second gear reduction unit 28 and extends from the gear reduction unit 28 axially along axis 38 through the gear reduction housing 70, through the drive brake control housing 68, through the clutch control housing 66 and into the cylindrical chamber 84 of the bearing house 64. The end of the output shaft 26 located in cylindrical chamber 84 is rotatably mounted in the roller bearing 48 located in the input shaft 12 as shown in FIG. 4. Located axially along the output shaft 26 are a clutch mounting area 180, a brake mounting area 182 and a gear mounting area 184.

Clutch 16 comprises a clutch disk support member 190, a plurality of driven clutch plates 192 and the plurality of driving clutch plates 194. Clutch disk support member 190 is fixedly mounted to output shaft 16 in the clutch mounting area 180 such that it rotates with output shaft 26. The outer surface of disk support member 190 is provided with a plurality of axially extending splines 198 for connecting engagement with associated notches 200 in the inner periphery of the plurality of driven clutch plates 192. The plurality of driven clutch plates 192 are free to move axially along the splines 198.

The plurality of driving clutch plates 194 are disposed interjacent or interleaved between the plurality of driven clutch plates 192 and are provided with notches 201 on their outer periphery for connecting engagement with splines 49 of input shaft 12. The plurality of driving clutch plates 194 are free to move axially along the splines 49. The driven clutch plates 192 and the driving clutch pates 194 are held in connecting engagement with splines 198 and splines 49 by abutment ring 202 and the first activation means 106.

In operation, coil springs 98 normally bias the first activation means 106 to the right as shown in FIG. 1. Driving clutch plates 194 are free to rotate relative to the driven clutch plates 192 whereby input shaft 12 is free to rotate relative to output shaft 26. When DC voltage is applied to the DC voltage clutch coil 94, the driving clutch plates 194 and driven clutch plates 192 are clamped together between abutment ring 202 and the first activation means 106 by movement of the activation means 106 to the left as shown in FIG. 1. This causes the rotation of the output shaft 26 by the input shaft 12. When the DC voltage is removed from the clutch coil 94, the coil springs 98 separate the driving clutch plates 194 from the driven clutch plate 192 and the input shaft 12 is free to rotate relative to output shaft 26.

Drive brake 24 comprises a brake disk support member 210, a plurality of rotating brake plates 212 and a plurality of reacting brake plates 214. Brake disk support member 210 is fixedly mounted to the output shaft 26 in the brake mounting area 182 such that it rotates with the output shaft 26. The outer surface of brake support member 210 is provided with a plurality of axially extending splines 218 for connecting engagement with associated notches 220 in the inner periphery of the plurality of rotating brake plates 212. The plurality of rotating brake plates 212 are free to move axially along the splines 218. Rotating brake plates 212 are held in connecting engagement with the splines 218 by abutment ring 222 and the second activation means 126.

The plurality of reaction brake plates 214 are disposed interjacent or interleaved between the plurality of rotating brake plates 212. The interior surface of brake gear 244 is provided with a plurality of axially extending splines 245 for connecting engagement with associated notches 247 in the outer periphery of the plurality of reaction brake plates 214. This plurality of reaction brake plates 214 are free to move axially along the splines 245. Reaction brake plates 214 are held in connecting engagement with the splines 245 by retaining means 222 and the second activation means 126.

In operation, coil springs 118 normally bias the second activation means 126 to the right as shown in FIG. 1. Reaction brake plates 214 and rotating brake plates 212 are clamped together between abutment ring 222 and second activation means 126 by the spring force exerted by coil springs 118 thereby locking output shaft 26 to the brake gear 244. When DC voltage is applied to the DC voltage brake coil 114, second activation means 126 moves to the left as shown in FIG. 1. Rotating brake plates 212 are thereby free to rotate relative to the reaction brake plates 214 whereby output shaft 26 is free to rotate with respect to brake gear 244. When the DC voltage is removed from brake coil 114, coil springs 118 clamp together reaction brake plates 214 and rotating brake plates 212 by the spring force exerted by coil springs 118 thereby locking the output shaft 26 to the brake gear 244.

Low speed drive motor 18 is fixedly attached to plate 156 of radially extending lobe 150 of gear reduction housing 70. Low speed drive motor 18 has drive shaft 230 located generally parallel to the axis 38 and extending from the interior of the lobe cavity 152 through the motor and into the motor brake 20. Motor brake 20 is of a design well known in the art and is connected to the driveshaft 230 such that when there is no power supplied to motor brake 20, the motor brake 20 is in the applied condition thus prohibiting driveshaft 230 from rotating. When power is supplied, motor brake 20 is released. Motor brake 20 and low speed drive motor 18 are electrically wired together such that power to drive the motor 18 and release of the motor brake 20 occurs simultaneously thus starting the motor 18 and releasing motor brake 20 at the same time. In the same manner, when power is cut to the motor 18, power to the motor brake 20 is also cut thereby applying motor brake 20 to stop driveshaft 230.

Driveshaft 230 extends into the lobe chamber 152 through cylindrical hole 158 in plate 156 as described above. Seal 160 is positioned into cylindrical hole 158 and rides against driveshaft 230 for sealing the lobe chamber 152 from low speed drive motor 18.

First gear reduction unit 22 comprises drive gear 240, intermediate gear 242 and brake gear 244. Drive gear 240 is fixedly mounted to drive shaft 230 of the low speed drive motor 18. Intermediate gear 242 is rotatably mounted on an axis generally parallel to axis 38 within lobe chamber 152 as shown in FIG. 1. Intermediate gear 242 is meshed with drive gear 240 and also with brake gear 244. Intermediate gear 242 can be of the compound gear design as shown in FIG. 1 or it can be a single gear depending upon the gear reduction ratio required.

Brake gear 244 has a first cylindrical inner surface 250 for rotatably mounting brake gear 244 on output shaft 26 at gear mounting area 184. A second cylindrical inner surface 252 extends generally parallel to axis 38 and forms an integral member of the drive brake as described above. Brake gear 244 is meshed with the intermediate gear 242. The gear reduction value of the first gear reduction unit 22 is a function of the numbers of teeth on drive gear 244, the plurality of number of teeth on intermediate gear 242 and the number of teeth on brake gear 244.

Second gear reduction unit 28 comprises a double helical gear reduction unit whose design is well known in the art. The input to the second gear reduction unit 28 is from the output shaft 26. The output of the second gear reduction unit 28 is coupled by methods known in the art to the input member of a drive system, for example, to the pinion of a pinion drive system of a tool tray.

Figure 3:
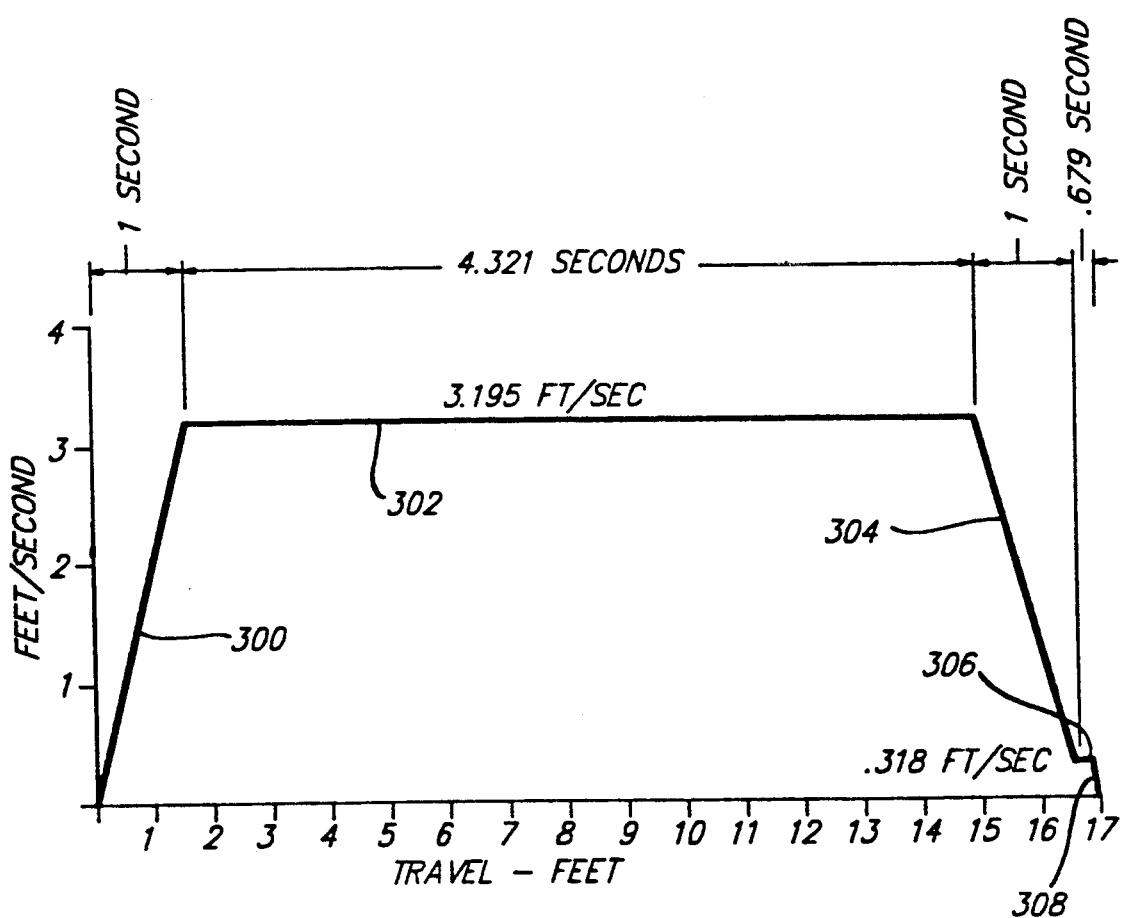
FIG. 3 is a motion diagram of a tool tray which is moved utilizing a two speed drive system in accordance with the present invention.

The motion diagram in FIG. 3 represents a typical motion curve achievable with the two speed drive unit of the present invention. The motion diagram in FIG. 3 comprises five stages of motion, the initial acceleration stage 300, the high speed linear travel stage 302, the high speed deceleration stage 304, the low speed linear travel stage 306, and low speed deceleration stage 308.

The operation of the cycle begins with the high speed drive motor rotating at full speed in the correct direction driving input shaft 12. Clutch 16 is in the released position and drive brake 24 is in the applied condition due to a lack of voltage being supplied to clutch coil 94 and brake coil 114. Low speed drive motor 18 is stopped and motor brake 20 is in the applied condition. Output shaft 26 is held stationary by drive brake 24 which reacts through first gear reduction unit 22, through low speed drive motor 18 to motor brake 20.

Simultaneously, appropriate full power is provided to low speed drive motor 18, motor brake 20 and main brake 24. Also simultaneously, an appropriate reduced voltage is applied to clutch 16. Low speed drive motor 18 rotates at full speed driving first gear reduction unit 22 due to the simultaneous release of motor brake 20 and drive brake 24. Output shaft 26 is not driven by low speed drive motor 18 at this point.

The reduced voltage applied to clutch 16 begins to engage clutch 16 and drive output shaft 26. As the voltage to the clutch 16 is increased to full voltage, clutch 16 continues to engage until input shaft 12 is coupled to output shaft 26. This acceleration stage is designated by reference numeral 300 in FIG. 3. Because a DC voltage coil is used for clutch coil 94, it is possible to adjust the slope of the acceleration curve to suit a particular requirement. The rate of acceleration is controlled by the rate of increasing the DC voltage to clutch coil 94 from 0 to full voltage.

The high speed travel stage 302 occurs when the high speed drive motor is operating at full speed clutch 16 is engaged, drive brake 24 is released, low speed drive motor 18 is operating at full speed and motor clutch 20 is released.

The high speed travel stage 302 continues until a deceleration limit switch (not shown) is tripped. At this point the appropriate DC voltage is disconnected from clutch 16 and an appropriate reduced voltage is applied to drive brake 24. The disconnecting of voltage to clutch 16 releases clutch 16 and input shaft 12 is free to rotate relative to output shaft 26. The application of the reduced voltage to drive brake 24 begins the application of the brake and effects the deceleration of the tool tray as depicted by the deceleration stage 304 in FIG. 3. Brake coil 114 is also a DC voltage coil similar to clutch coil 94. Therefore, the slope of the deceleration stage 304 can be controlled by the rate of reduction of voltage to the brake coil 114.

When the speed of output shaft 26 has been reduced to coincide with the speed of low speed drive motor 18, the dwell stage 306 shown in FIG. 3 is entered. The length of the dwell stage 306 is determined by the accuracy by which drive unit 12 can be decelerated during the deceleration stage 304. During this dwell stage 306, output shaft 26 is driven by low speed drive motor 18 through first gear reduction unit 22, and through drive brake 24.

The dwell stage 306 continues until a final limit switch (not shown) is tripped and the low speed deceleration stage 308 is entered. At this point, the power is disconnected from low speed drive motor 18, motor brake 20 and drive brake 24 bringing the output shaft to a stop. The cycle has now been completed and the unit is ready for the reverse cycle. For the reverse cycle, the high speed drive motor and low speed drive motor 18 are reversed in direction. The operation of the two speed drive during the reverse cycle is identical to the above described cycle.

By example, the motion diagram illustrated in FIG. 3 was achieved by utilizing a 20 HP, 1750 RPM high speed drive motor, a 2 HP 1750 RPM low speed drive motor 18, a first gear reduction unit 22 of 10.019 and a second gear reduction unit 28 of 14.339. The example presented was able to move a 25,000 pound tool tray 17 feet in 7 seconds with an index accuracy of +/−0.050 inches.

While the above detailed description describes the preferred embodiment of the present invention, it should be understood that the present invention is susceptible to modification, variation and alteration without deviating from the scope and fair meaning of the subjoined claims.

What is claimed is:

1. A two speed drive unit for an apparatus comprising:
    output means for transmitting rotation from said two speed drive unit;
    first input means for transmitting rotation to said output means;
    second input means for transmitting rotation to said output means;
    selectively operable first brake means for prohibiting rotation of said second input means;
    gear reduction means for reducing the rotational speed of said second input means; said gear reduction means operably connected to said second input means and disposed between said second input means and said output means;
    selectively operable second brake means for connecting said output means to said gear reduction means;
    first spring means for urging said second brake means into engagement to connect said output means to said gear reduction means;
    first electrical actuating means for releasing said second brake means, said first electrical actuating means operable in conjunction with said first spring means to apply said second brake means such that rotation of said output means follows a specified rate of deceleration;
    selectively operable clutch means for connecting said first input means to said output means;
    second spring means for urging said clutch means into a disengaged condition to allow said first input means to rotate relative to said output means;
    second electrical actuating means for engaging said clutch means, said second electrical actuating means operable in conjunction with said second spring means to engage said clutch means such that rotation of said output means follows a specified rate of acceleration.

2. The two speed drive unit of claim 1 wherein said output means comprises:

a shaft rotatably mounted in a stationary housing;

a first annular collar extending from said shaft for rotation therewith and disposed in coaxial spaced relation thereabout; and a second annular collar extending from said shaft for rotation therewith and disposed in coaxial spaced relation thereabout.

3. The two speed drive unit of claim 2 wherein said selectively operable second brake means comprises a plurality of interleaved first friction disks alternately splined, respectively, to said gear reduction means and said first annular collar.

4. The two speed drive unit of claim 2 wherein said selectively operable clutch means comprises:

a plurality of interleaved second friction disks alternately splined, respectively, to said first input means and said second annular collar.

5. A two speed drive unit for an apparatus comprising:

a stationary housing;

output means for transmitting rotation from said two speed drive unit, said output means including a shaft rotatably mounted in said housing, a first annular collar extending from said shaft for rotation therewith and disposed in coaxial spaced relation thereabout, and a second annular collar extending from said shaft for rotation therewith and disposed in coaxial spaced relation thereabout;

first input means rotatably mounted in said housing for transmitting rotation to said output means;

second input means rotatably mounted in said housing for transmitting rotation to said output means, said second input means having an output shaft;

selectively operable first brake means for prohibiting rotation of said output shaft with respect to said housing;

gear reduction means for reducing the rotational speed of said second input means, said gear reduction means extending from said output shaft of said second input means for rotation therewith;

selectively operable second brake means for locking said output shaft to said gear reduction means, said second brake means including a plurality of interleaved first friction disks alternately splined, respectively, to said gear reduction means and said first annular collar, said first friction disks extending axially between first and second ends; said second end of said first friction disks adjacent said gear reduction means;

selectively operable clutch means for locking said first input means to said output means, said clutch means including a plurality of interleaved second friction disks alternately splined, respectively, to said first input means and said second annular collar, said second friction disks extending axially between first and second ends, said second end of said second friction disks adjacent said first input means;

first piston means for engaging said second brake means, said first piston means slidably disposed with respect to said first annular collar, said first piston means being adjacent said first end of said first disk members and axially movable towards said second end of said first disk members;

first spring means for urging said first piston means into contact with said first friction disks and said first friction disks into compressed engagement with said gear reduction means whereby to engage said second brake means and transmit rotation from said gear reduction means to said output means;

second piston means for engaging said clutch means, said second piston means slidably disposed with respect to said second annular collar, said second piston means being adjacent said first end of said second disk members and axially movable towards said second end of said second disk members;

second spring means for urging said second piston means away from said second friction disks and away from said first input means whereby to release said clutch means and free said output means to rotate relative to said first input means;

first electrical actuating means adjacent said first piston means for selectively moving said first piston means against said first spring means to disengage said second brake means when said actuating means is activated, said first electrical actuating means operable in conjunction with said first spring means to apply said second brake means such that rotation of said output means follows a specified rate of deceleration;

said electrical actuating means adjacent said second piston means for selectively moving said second piston means against said second spring means and into contact with said second friction disks and said second disks into compressed engagement with said first input means whereby to engage said clutch means and transmit rotation from said first input means to said output means with a specified rate of acceleration of said output means.

6. The two speed drive unit of claim 5 further comprising fan means for moving air around said station housing.

7. The two speed drive unit of claim 5 further comprising a second gear reduction means fixedly attached to said output means, said second gear reduction means having a second output means for transmitting rotation from said second gear reduction means.

* * * * *

UNITED STATES PATENT AND TRADEMARK OFFICE
CERTIFICATE OF CORRECTION

PATENT NO. : 5,195,623

DATED : March 23, 1993

INVENTOR(S) : Gordon M. Sommer

It is certified that error appears in the above-identified patent and that said Letters Patent is hereby corrected as shown below:

Column 3, line 33, "contract" should be --contact--.

Column 5, line 30, "pates" should be --plates--.

Column 8, line 6, after "is", insert --then--.

Signed and Sealed this

Twenty-ninth Day of March, 1994

*Attest:*

BRUCE LEHMAN

*Attesting Officer*     *Commissioner of Patents and Trademarks*